No. 695,141. Patented Mar. 11, 1902.
E. BOYES.
MEANS FOR MAINTAINING IN HEATED CONDITION DECOCTIONS OF COFFEE, TEA, OR OTHER LIQUIDS.
(Application filed Dec. 16, 1901.)
(No Model.) 2 Sheets—Sheet 1.
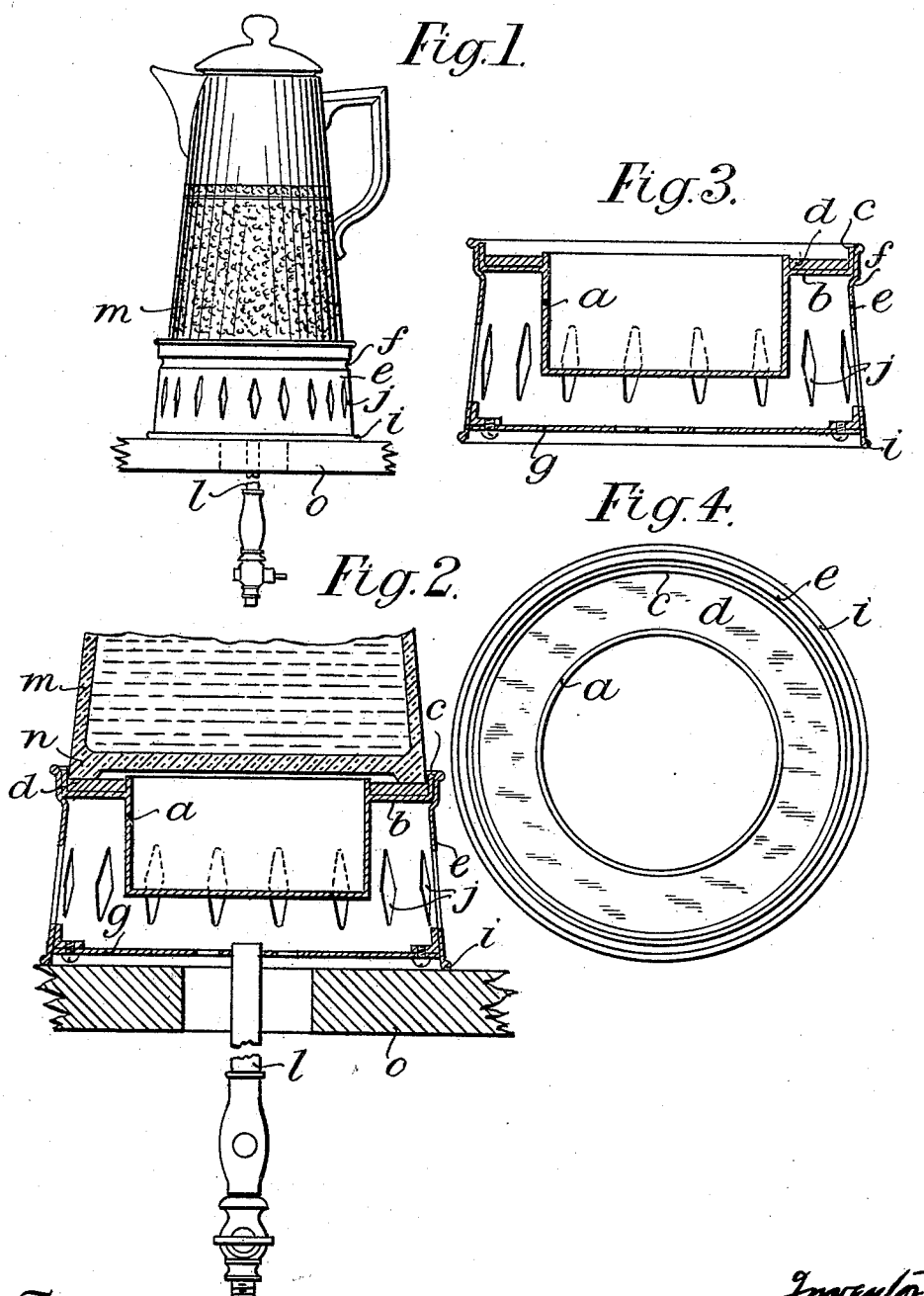

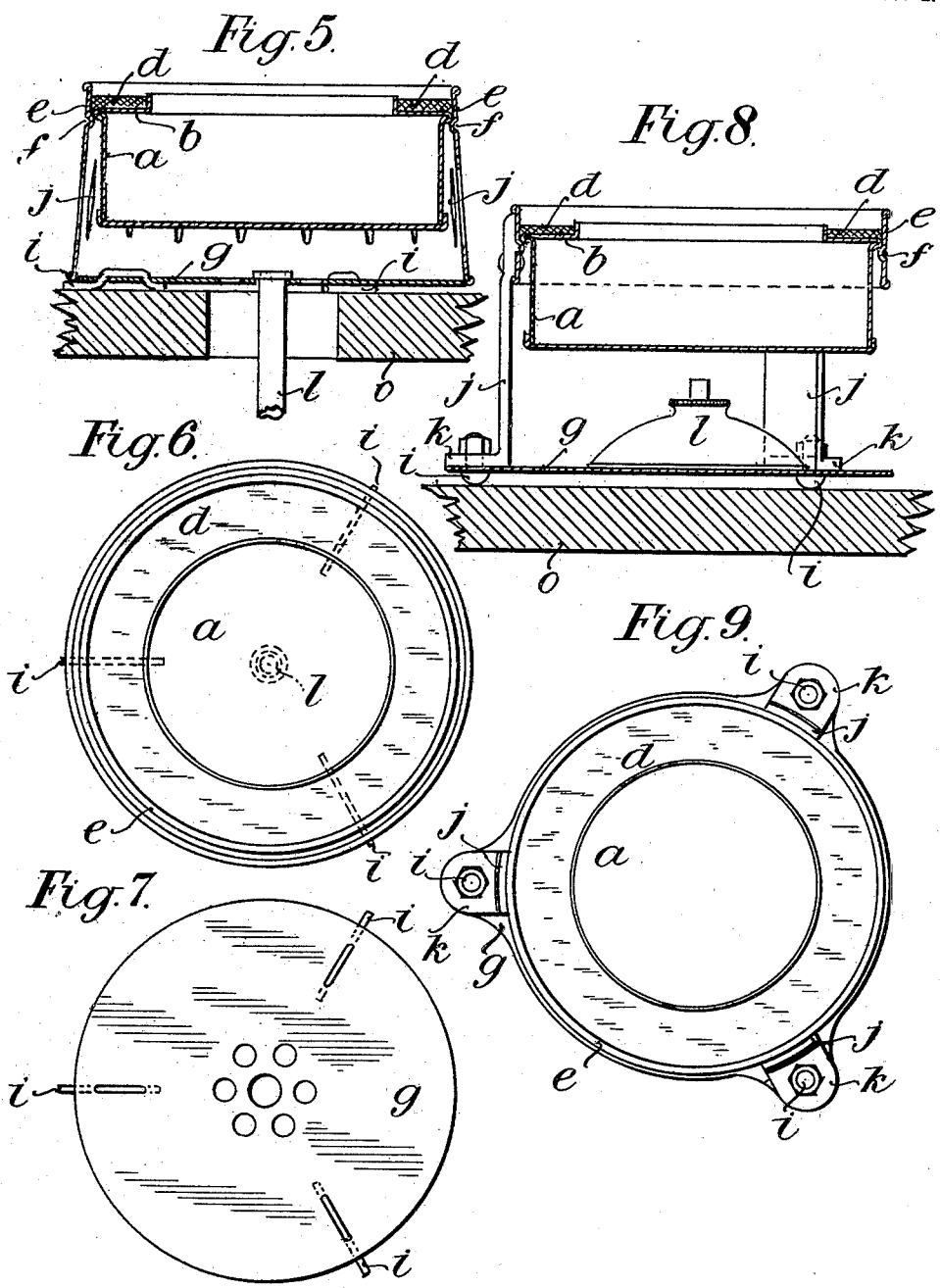

UNITED STATES PATENT OFFICE.

EBENEZER BOYES, OF PECKHAM, ENGLAND.

MEANS FOR MAINTAINING IN HEATED CONDITION DECOCTIONS OF COFFEE, TEA, OR OTHER LIQUIDS.

SPECIFICATION forming part of Letters Patent No. 695,141, dated March 11, 1902.

Application filed December 16, 1901. Serial No. 86,145. (No model.)

*To all whom it may concern:*

Be it known that I, EBENEZER BOYES, wholesale coffee-dealer, a subject of the King of Great Britain, residing at Albert Road, Peckham, in the county of Surrey, England, have invented certain new and useful Improvements in Means for Maintaining in a Heated Condition Decoctions of Coffee, Tea, or other Liquids, of which the following is a specification, reference being had to the accompanying drawings, and to the letters marked thereon.

The invention relates to improvements in means for maintaining in a heated condition decoctions of coffee and tea or other liquids.

In small inns and refreshment-bars, where there is only an occasional demand for tea, coffee, or the like, it is difficult or expensive to keep a supply, inasmuch as the apparatus usually employed for that purpose is of large capacity and no provision has hitherto been made for economically and effectually dealing with small quantities.

Now the object of the present invention is to obtain a simple and inexpensive apparatus by the aid of which a comparatively small quantity of tea, coffee, or the like may be maintained in a heated condition ready for use in an economical manner and without liability to boil or become burned.

In the accompanying drawings, Figure 1 is an elevation of a heating apparatus constructed according to the present invention and showing a jug in position thereon. Fig. 2 is a vertical section thereof, part of the jug being broken away. Fig. 3 is a vertical section thereof with the jug removed. Fig. 4 is a plan thereof. Fig. 5 is a vertical section of a similar apparatus of slightly-modified construction. Fig. 6 is a plan thereof. Fig. 7 is a plan of the base-plate separately. Fig. 8 is a similar view to Fig. 3, illustrating a further modification; and Fig. 9 is a plan thereof.

In the several figures, in which like parts are indicated by similar letters of reference, Fig. 1 is drawn to a reduced scale with respect to the other figures of the drawings.

Referring to Figs. 1 to 4, $a$ represents a cylindrical or circular vessel of suitable capacity, which may conveniently be formed of cast-iron or it might be of other suitable material, which is adapted to be partially filled with boiling water. This vessel or boiler $a$ is at or near but preferably slightly below its top edge and exteriorly thereof formed with an annular flange $b$, provided with a rising rim $c$, thus forming a kind of channel or trough adapted to receive a flat ring $d$ of packing material—such as felt, asbestos, or the like—intended to form a cushioned seat for the flange $n$ of an earthenware jug $m$ or other vessel containing the liquid to be maintained in a heated condition and at the same time constitute a packing to make a more or less steam-tight joint between the boiler $a$ and the flange of the jug $m$ or other vessel. The boiler thus constructed may be supported in any suitable manner, so as to admit of a gas-jet, spirit-lamp, or the like being arranged beneath the same; but the preferred stand or support, and which at the same time forms a shield for the gas or other flame, consists of a cylindrical or conical shell $e$, of sheet iron, brass, copper, or the like, bent into the required shape and at the meeting edges seamed, soldered, or brazed. The stand or support $e$ is near to its top edge formed with an interiorly-projecting annular bead $f$, upon which the flange $b$ of the boiler $a$ rests, while at a short distance from the bottom edge it is furnished with a base-plate $g$, fixed therewith and provided with a central perforation $h$ to admit a single-jet atmospheric burner $l$ of any suitable type, by the aid of which the water in the boiler $a$ is adapted to be maintained in the required heated condition. The bottom edge of the stand is formed with a curl or scroll $i$ to rest upon a table or counter $o$, upon which the device may be placed, and an insulating air-space is thus provided between the base-plate $g$ and the table or counter $o$ and serves to protect the latter from the heat of the gas-jet, while the screen $e$ is provided with rings of perforations $j$ around the same to admit a supply of air to the flame and to carry off the products of combustion.

Although a gas-jet is perhaps best adapted for refreshment-bars or the like, it will be understood that a spirit-lamp may be substituted therefor, if desired, and in this case the base-plate $g$ may be dispensed with.

In the example given at Figs. 5 to 7 the apparatus is substantially the same as that hereinbefore described with respect to the previous figures; but in this case the boiler $a$ is assumed to be formed of sheet-copper, and the flange or trough *b* instead of projecting exteriorly projects interiorly thereof, and the upper part of the casing *e* forms one of the sides of the trough *b*. The base-plate *g* in this example is formed separate from the casing *e*, and it is provided with feet *i*, which rest upon the table or counter *o* and serve to support it at a suitable distance above said counter to provide the necessary insulating air-space, hereinbefore described, or the base-plate *g* might be fixed with the casing *e*, as hereinbefore shown and described with respect to Figs. 1 to 4.

In the example given at Figs. 8 and 9 the construction of the flange or trough *b* is similar to that hereinbefore described with respect to Fig. 5; but in this arrangement the casing *e* takes the form of a short band, to which are fixed legs *j* at their lower ends, cranked and spread out to form feet *k*. The feet *k* are perforated to receive headed bolts, rivets, or the like *i* and rest upon the base-plate *g*, which is correspondingly perforated and to which they are fixed by the bolts *i*, the heads of which form studs or feet designed to support the device upon a counter or table and leave the required air or insulating space between the latter and the base-plate. The heating means in this example consists of a spirit-lamp *l*, which rests upon the base-plate *g*; but it will be understood that any other suitable lamp or a gas-jet might be substituted therefor.

By the means hereinbefore described a single gas-jet, spirit-lamp, or the like will suffice to keep the water in the boiler *a* constantly boiling, and the steam thereby generated will be more or less confined by the jug and packing and a slight pressure thus created, and this steam extending over almost the entire area of the bottom of the jug will impart sufficient heat to the contents thereof to maintain the same in a heated condition, but without liability to boil or burn.

Having now particularly described and ascertained the nature of the said invention and in what manner the same is to be performed, I declare that what I claim is—

1. A heating apparatus for a single jug comprising a circular open-topped boiler adapted to contain water and at its upper part provided with an annular flange-like trough adapted to receive a ring of packing material, a ring of packing within said trough serving to form a seat for a jug, means for supporting the boiler and means for heating the same substantially as herein shown and described.

2. A heating apparatus for a single jug comprising a circular open-topped boiler adapted to contain water and at its upper part provided with an annular flange-like trough adapted to receive a ring of packing material, a ring of packing within said trough serving to form a seat for a jug, a jug formed at its bottom with a projecting ring or flange to enter the trough, means for supporting the boiler and means for heating the same substantially as herein shown and described.

3. A heating apparatus for a single jug comprising a circular open-topped boiler adapted to contain water and at its upper part provided with an annular flange-like trough adapted to receive a ring of packing material, a ring of packing within said trough serving to form a seat for a jug a circular casing surrounding the boiler and interiorly formed with an annular bead upon which the flange of the boiler rests so as to leave a space beneath the boiler for heating means and means for heating the boiler substantially as herein shown and described.

EBENEZER BOYES.

Witnesses:
C. M. MOURNSWHIP,
C. H. WHITE.